United States Patent
You et al.

(10) Patent No.: US 11,643,094 B2
(45) Date of Patent: May 9, 2023

(54) NOISE CONTROL APPARATUS, VEHICLE HAVING THE SAME AND METHOD FOR CONTROLLING THE VEHICLE

(71) Applicants: HYUNDAI MOTOR COMPANY, Seoul (KR); KIA MOTORS CORPORATION, Seoul (KR)

(72) Inventors: Jung Keun You, Suwon-si (KR); Kaangdok Yee, Yongin-si (KR); ChiSung Oh, Hwaseong-si (KR); Joongkwan Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 331 days.

(21) Appl. No.: 17/064,874

(22) Filed: Oct. 7, 2020

(65) Prior Publication Data
US 2021/0323562 A1    Oct. 21, 2021

(30) Foreign Application Priority Data
Apr. 21, 2020    (KR) ........................ 10-2020-0048251

(51) Int. Cl.
*B60W 50/02*    (2012.01)
*B60W 40/107*    (2012.01)
(Continued)

(52) U.S. Cl.
CPC ..... *B60W 50/0205* (2013.01); *B60R 11/0247* (2013.01); *B60W 40/107* (2013.01);
(Continued)

(58) Field of Classification Search
CPC ........... B60W 50/0205; B60W 40/107; B60W 2050/0215; B60W 2420/54;
(Continued)

(56) References Cited

U.S. PATENT DOCUMENTS 10,665,220 B1 *    5/2020    Nielsen ................. H04R 3/005
10,770,056 B1 *    9/2020    Zafeiropoulos .... G10K 11/1783
(Continued)

FOREIGN PATENT DOCUMENTS

EP    3159891 A1 *    4/2017    ....... G10K 11/17833

*Primary Examiner* — Peter D Nolan
*Assistant Examiner* — Anwar Mohamed
(74) *Attorney, Agent, or Firm* — Morgan, Lewis & Bockius LLP

(57) ABSTRACT

The present disclosure relates to a noise control apparatus, vehicle having the same and method for controlling the vehicle to reduce indoor noise. In accordance with an aspect of disclosure, the vehicle collects sound by using a sound collector while driving the vehicle; detects vibration occurring in the vehicle by using a vibration detector; detects an occupant in the vehicle by using an occupant detector; generates a virtual reference signal based on an actual reference signal for the detected vibration; acquires location information of the occupant's ear based on the occupant information; generates a virtual error signal based on the
(Continued)

acquired ear location information and the actual noise signal for the collected sound; generates a noise control signal based on the virtual error signal and the virtual reference signal; and outputs the generated noise control signal as sound.

18 Claims, 13 Drawing Sheets

(51) Int. Cl.
  *B60R 11/02* (2006.01)
  *H04R 5/04* (2006.01)
  *H04R 3/04* (2006.01)
  *G06F 17/14* (2006.01)
(52) U.S. Cl.
  CPC ............ *G06F 17/142* (2013.01); *H04R 3/04* (2013.01); *H04R 5/04* (2013.01); *B60W 2050/0215* (2013.01); *B60W 2420/54* (2013.01); *B60W 2520/105* (2013.01); *H04R 2499/13* (2013.01)
(58) Field of Classification Search
  CPC .......... B60W 2520/105; B60R 11/0247; G06F 17/142; H04R 3/04; H04R 5/04; H04R 2499/13

See application file for complete search history.

(56) References Cited

U.S. PATENT DOCUMENTS

| | | | | |
|---|---|---|---|---|
| 10,839,786 | B1* | 11/2020 | Hera | G10K 11/17854 |
| 11,180,087 | B2* | 11/2021 | Hwang | H04S 7/307 |
| 11,476,069 | B2* | 10/2022 | Kim | H05K 1/184 |
| 2004/0247137 | A1* | 12/2004 | Inoue | G10K 11/17825 |
| | | | | 381/71.4 |
| 2006/0056642 | A1* | 3/2006 | Inoue | G10K 11/17883 |
| | | | | 381/71.11 |
| 2012/0143431 | A1* | 6/2012 | Kim | G05B 23/0216 |
| | | | | 701/32.8 |
| 2017/0353811 | A1* | 12/2017 | McGibney | H04S 7/303 |
| 2019/0304431 | A1* | 10/2019 | Cardinaux | G10K 11/17813 |
| 2020/0020315 | A1* | 1/2020 | Tachi | G10K 11/17854 |
| 2020/0391670 | A1* | 12/2020 | Jain | H04R 3/04 |
| 2021/0020156 | A1* | 1/2021 | Tachi | G10K 11/17855 |
| 2022/0059069 | A1* | 2/2022 | Kim | G10K 11/17825 |
| 2022/0208168 | A1* | 6/2022 | Aval | G10K 11/17815 |
| 2022/0294911 | A1* | 9/2022 | Katsumoto | H04N 1/00037 |
| 2022/0331028 | A1* | 10/2022 | Sternitzke | G06V 40/10 |

* cited by examiner

| FR LH | ~~FR RH~~ |
|---|---|
| ~~RR LH~~ | ~~RR RH~~ |

160

NOISE CONTROL APPARATUS, VEHICLE HAVING THE SAME AND METHOD FOR CONTROLLING THE VEHICLE

CROSS-REFERENCE TO RELATED APPLICATION(S)

This application is based on and claims priority under 35 U.S.C. § 119 to Korean Patent Application No. 10-2020-0048251, filed on Apr. 21, 2020, the disclosure of which is incorporated by reference in its entirety.

TECHNICAL FIELD

The present disclosure relates to a noise control apparatus, vehicle having the same and method for controlling the vehicle to reduce indoor noise.

BACKGROUND

A vehicle is a machine that is driven by driving wheels for the purpose of transporting people or cargo, and moves on a road.

In recent years, vehicles have been evolving as a means of entertainment and information exchange, not just a transportation means.

With the advancement of vehicle advancement and information communication technology, the head unit of a vehicle currently being released is configured to perform various functions as well as audio control functions such as FM/AM and CD, and air conditioning control functions. Examples of such various functions include Bluetooth, web browsing, chatting, TV watching, navigation, gaming, a function to take a picture or video through a camera, a voice storage function, and an image or video display function.

To this end, vehicle manufacturing companies are putting a lot of effort into hardware and software development to provide more complex and diverse functions.

Conventionally, various sound absorbing and insulating agents and low-noise tires have been used as a method for reducing driving noise generated during vehicle driving.

However, the method of reducing road noise through hardware such as sound absorbing and insulating agents and low-noise tires not only increases the cost, but also increases the vehicle weight, resulting in poor driving fuel efficiency and difficulty in blocking low-frequency noise.

SUMMARY

In view of the above, an aspect of the present disclosure provides a noise control apparatus, a vehicle having the same, and the method thereof generating and outputting noise control signal based on virtual error signal at the virtual microphone and virtual reference signal at the acceleration sensor.

In accordance with an aspect of the present disclosure, a noise control apparatus may include a virtual reference signal generator configured to generate a virtual reference signal based on a vibration signal indicating vibration detected by a vibration detector and a structure information of a vehicle body; a virtual error signal generator configured to generate a virtual microphone based on an occupant information detected by an occupant detector, and generate a virtual error signal based on the virtual noise signal collected from the generated virtual microphone and an actual noise signal; and an active noise controller configured to generate a noise control signal based on the virtual error signal and the virtual reference signal and control an output of the generated noise control signal.

The noise control apparatus may further include a fast Fourier transformer configured to fast Fourier transform the virtual reference signal, and fast Fourier transform the virtual error signal; a frequency domain active filter configured to filter the fast Fourier transformed virtual reference signal and the fast Fourier transformed virtual error signal; and an inverse fast Fourier transformer configured to inverse Fourier transform the signal filtered by the frequency domain active filter and transfer the inverse Fourier transformed signal to the active noise controller.

The virtual error signal generator may acquire an actual secondary path based on the location information of the actual microphone and the noise signal collected from an actual microphone, generate a noise signal in the actual secondary path based on the noise control signal outputted from the active noise controller and the actual secondary path, and acquire the virtual noise signal in a virtual secondary path based on the noise control signal outputted from the active noise controller and the virtual secondary path.

The virtual error signal generator may include a transfer function that subtracts the noise signal from the virtual second path from the noise signal from the actual second path.

The virtual error signal generator may periodically receive the occupant information detected by the occupant detector, and determines a change in the occupant's boarding posture based on the periodically received occupant information, and generate the virtual microphone when it is determined that the occupant's boarding posture changes.

In accordance with an aspect of the present disclosure, a vehicle may include a sound collector configured to collect sound and output a virtual noise signal for the collected sound; a vibration detector configured to detect vibration and output an actual reference signal for the detected vibration; an occupant detector configured to detect an occupant and output occupant information on the detected occupant; and a controller configured to generate a virtual reference signal based on the actual reference signal, acquire location information of the occupant's ear based on the occupant information, generate a virtual error signal based on the acquired ear location information, generate a noise control signal based on the virtual error signal and the virtual reference signal, and control an output of the generated noise control signal.

In accordance with an aspect of the present disclosure, a vehicle may include a plurality of microphones provided at different locations in the vehicle; a plurality of acceleration sensors provided at different locations in the vehicle; a controller configured to diagnose failures of the plurality of acceleration sensors and the plurality of microphones, and generate a virtual reference signal using the remaining acceleration sensors when diagnosing a failure of at least one of the plurality of acceleration sensors, and generate a noise control signal using the remaining microphones when diagnosing at least one of the plurality of microphones.

The controller may post-process the acceleration signal received from an acceleration sensor diagnosed as a failure, and post-process the noise signal received from the at least one microphone diagnosed as a failure.

The vehicle may further include a display, and the controller may control the display to display information on the microphone diagnosed as the failure or the acceleration sensor diagnosed as the failure.

The controller may generate a virtual error signal by using a microphone provided at a location closest to a microphone diagnosed as a failure among the remaining microphones, and generate a virtual reference signal using an acceleration sensor provided at a location closest to an acceleration sensor diagnosed as a failure among the remaining acceleration sensor.

The vehicle may further include a display; and an input configured to receive a user input; and the controller may control the display of request information for input of occupant information for each seat, and generate a virtual microphone based on seat-specific occupant information inputted in the input when diagnosing a failure of at least one of the plurality of acceleration sensors and the plurality of microphones.

The occupant information may include occupant identification information, occupant height information, occupant age information, or occupant age-specific information.

The occupant detector may further include at least one image acquirer acquires an indoor image, and wherein the controller acquires location information of the occupant's ear based on the indoor image.

The controller may generate an actual secondary path to an actual microphone, generates an actual noise signal in the generated secondary path, generate a virtual secondary path to the virtual microphone, generate a virtual noise signal in the generated virtual secondary path, and generates the virtual error signal based on the actual noise signal and the virtual noise signal.

The controller may further include an amplifier (AMP) configured to mix a received audio signal and the noise control signal in respond to the received audio signal, and output the mixed signal.

The vehicle may include a storage configured to store structural information of the vehicle body, and the controller may generate the virtual reference signal based on information stored in the storage and a noise signal indicating vibration detected by the vibration detector.

In accordance with an aspect of the present disclosure, a method for controlling a vehicle, the method may include collecting sound by using a sound collector while driving the vehicle; detecting vibration occurring in the vehicle by using a vibration detector; detecting an occupant in the vehicle by using an occupant detector; generating a virtual reference signal based on an actual reference signal for the detected vibration; acquiring location information of the occupant's ear based on the occupant information; generating a virtual error signal based on the acquired ear location information and the actual noise signal for the collected sound; generating a noise control signal based on the virtual error signal and the virtual reference signal; and outputting the generated noise control signal as sound.

In accordance with an aspect of the present disclosure, a method for controlling a vehicle may include collecting sound using a plurality of microphones located at different locations in the vehicle while driving the vehicle; detecting vibration occurring in the vehicle using plurality of acceleration sensors located at different locations in the vehicle; detecting an occupant in the vehicle by using an occupant detector; generating a virtual reference signal based on an active reference signal for the detected vibration; acquiring location information of the occupant's ear based on the occupant information; generating a virtual error signal based on the acquired ear location information and the active noise signal for the collected sound; generating a noise control signal based on the virtual error signal and the virtual reference signal; and outputting the generated noise control signal as sound. Generating the noise control signal may include diagnosing failures of the plurality of acceleration sensors and the plurality of microphones, generating a virtual reference signal using remaining acceleration sensors when diagnosing a failure of at least one of the plurality of acceleration sensors, and generating a noise control signal using remaining microphones when diagnosing a failure of at least one of the plurality of microphones.

The method may further include controlling display of request information for inputting occupant information for each seat when diagnosing a failure of at least one of the plurality of acceleration sensors and the plurality of microphones, generating a virtual microphone based on the occupant information for each seat entered in the input, and regenerating a virtual error signal based on location information of the generated virtual microphone.

The occupant information may include occupant identification information, occupant height information, occupant age information, or occupant age-specific information.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
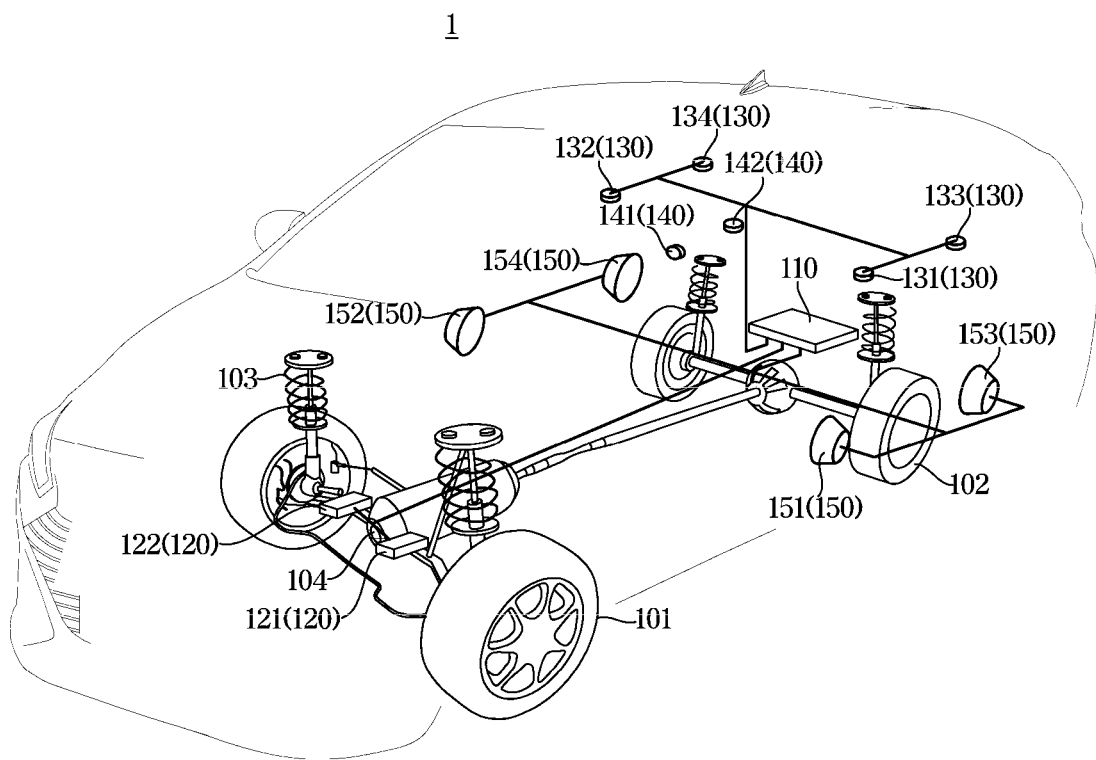
FIG. 1 is an exemplary view of a vehicle equipped with a noise control apparatus according to an embodiment.

Like reference numerals refer to like elements throughout. The present disclosure does not describe all elements of the embodiments, and overlaps between the general contents or the embodiments in the technical field to which the present disclosure belongs.

This specification does not describe all elements of the exemplary embodiments of the present disclosure and detailed descriptions on what are well known in the art or redundant descriptions on substantially the same configurations may be omitted. The term 'part', 'module', 'member', or 'block' used in the specification may be implemented in software or hardware, and a plurality of 'parts', 'modules', 'members', or 'blocks' may be embodied as one component, It is also possible that one 'part', 'module', 'member', or 'block' includes a plurality of components.

Throughout the specification, when an element is referred to as being "connected to" another element, it may be directly or indirectly connected to the other element and the "indirectly connected to" includes being connected to the other element via a wireless communication network.

In addition, when a part is said to "include" a certain component, this means that the part may further include other components, except to exclude other components unless otherwise stated.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the present disclosure.

Figure 2:
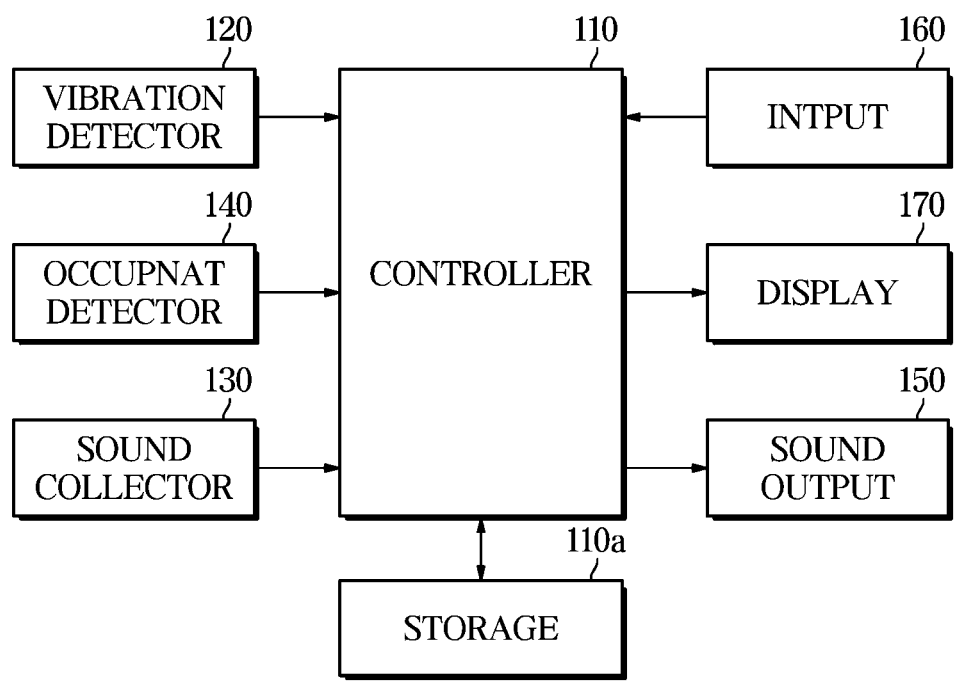
FIG. 2 is a control configuration diagram of a vehicle equipped with a noise control apparatus according to an embodiment.
Figure 3:
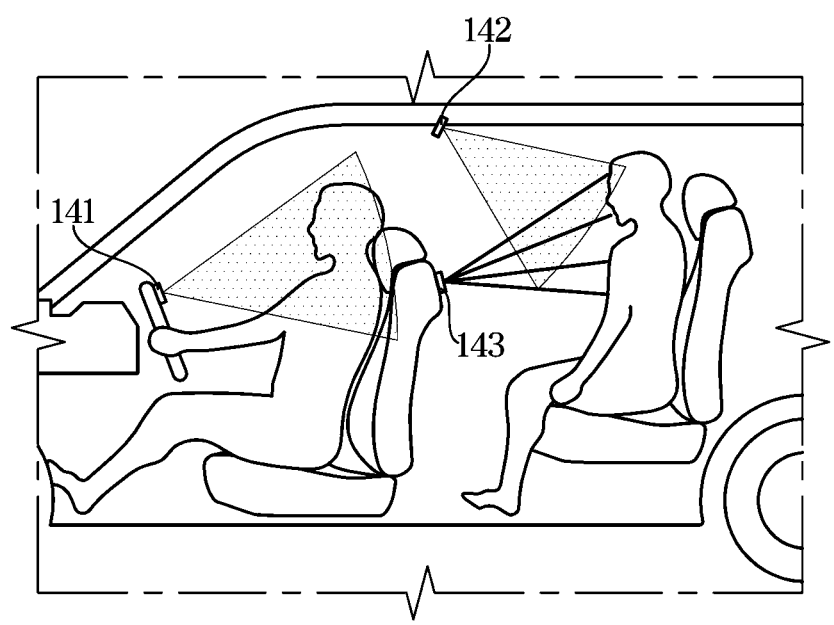
FIG. 3 is a diagram illustrating an arrangement of the occupant detector shown in FIG. 2.
Figure 4A:
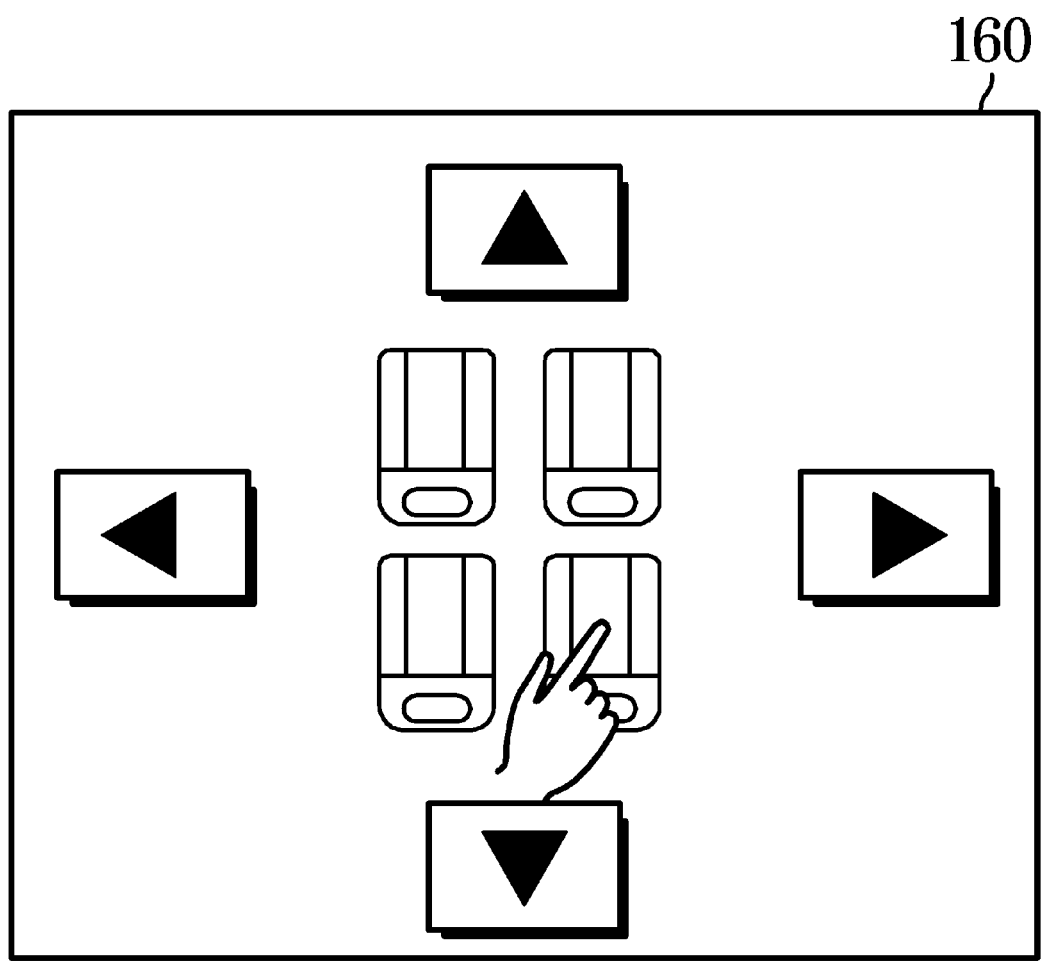
FIGS. 4A, 4B, and 4C are exemplary views of the input shown in FIG. 2.
Figures 4B, 4C:
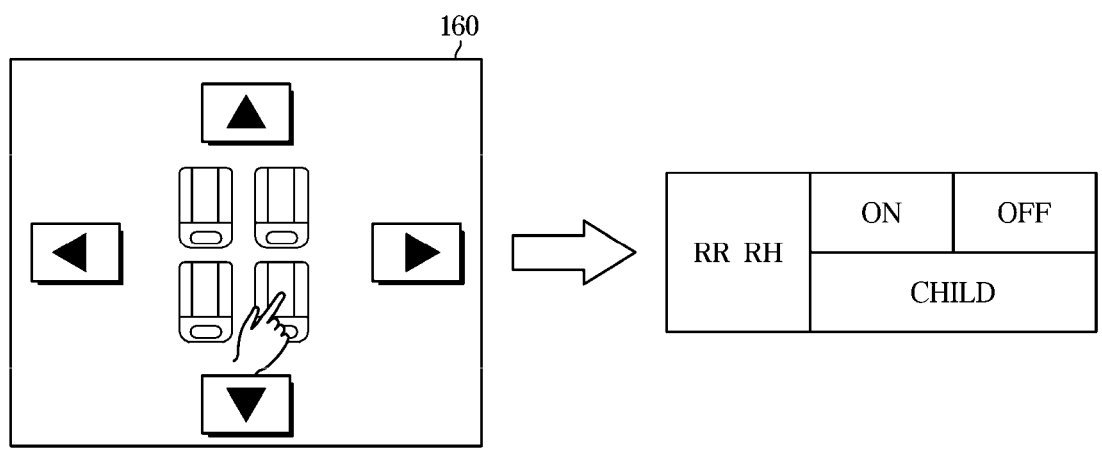
Figure 5A:
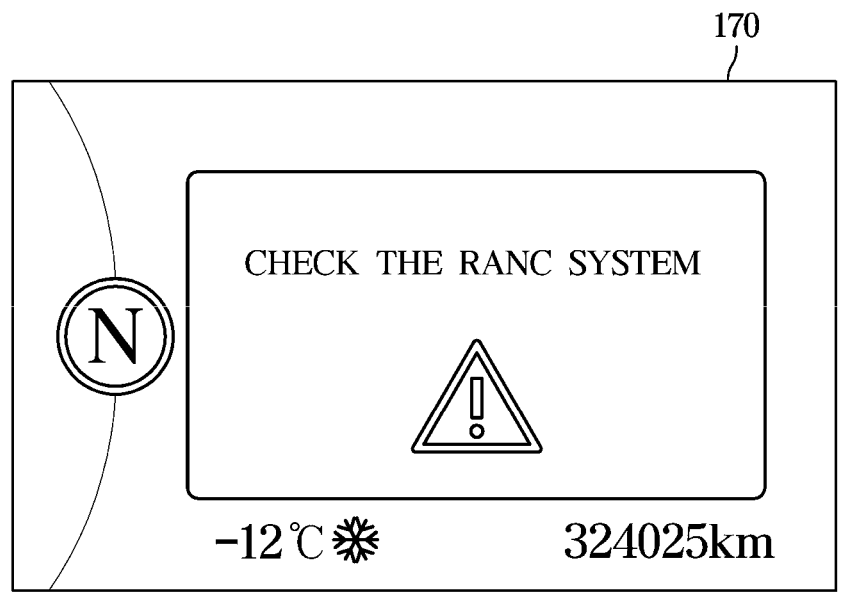
FIGS. 5A and 5B are exemplary views of the display illustrated in FIG. 2.
Figure 5B:
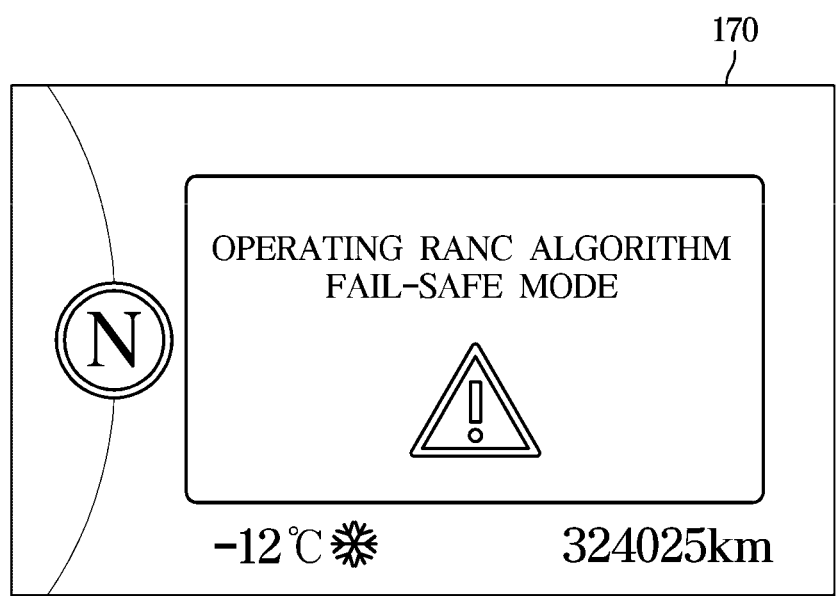

FIG. 1 is an exemplary view of a vehicle equipped with a noise control apparatus according to an embodiment, FIG. 2 is a control configuration diagram of a vehicle equipped with a noise control apparatus according to an embodiment, FIG. 3 is a diagram illustrating an arrangement of the occupant detector shown in FIG. 2, FIGS. 4A, 4B, and 4C are exemplary views of the input shown in FIG. 2, and FIGS. 5A and 5B are exemplary views of the display illustrated in FIG. 2.

The vehicle 1 according to the embodiment may be an internal combustion engine vehicle or an eco-friendly vehicle.

The vehicle 1 includes a body having an interior and an exterior, and a chassis in which a mechanical device required for driving is installed in the rest of the body except for the vehicle body.

The exterior of the vehicle body includes a front panel, a bonnet, a roof panel, a rear panel, a trunk, a front and rear door, and a window provided to be opened and closed on the front and rear doors.

The interior of the vehicle body includes a seat on which an occupant sits, a dashboard, and an instrument panel (that is, a cluster) displaying various information on the state of the vehicle on the dashboard.

The chassis of the vehicle 1 is a frame that supports the vehicle body, and may include front wheels 101 respectively disposed on the left and right in front of the vehicle body, rear wheels 102 disposed on the left and right sides of the rear of the vehicle body, a power device for applying a driving force to the front wheels 101 and the rear wheels 102, a steering device that changes the driving direction of the vehicle 1, a braking device that applies braking force to the front, rear, left and right wheels 101 and 102 to generate the vehicle's braking force and a suspension device 103 for controlling damping of the vehicle 1.

The power device is a device that generates a driving force required for driving of a vehicle and adjusts the generated driving force, and may include a power generating device that generates power and a power transmission device that transmits the generated power to a wheel.

The power generating device may include at least one of an engine and a motor that applies a driving force to a wheel.

The suspension device 103 of the vehicle 1 connects the axle 104 and the vehicle body and fixes the wheels 101 and 102 to the chassis of the vehicle 1 so that the vibration or shock that the axle 104 receives from the road surface is not directly transmitted to the vehicle body. The suspension device 103 is a device that prevents damage to the vehicle body and improves the ride comfort by controlling the vehicle body.

Such a suspension device includes a chassis spring that alleviates an impact from a road surface, and a shock absorber that attenuates and controls the free vibration of the chassis spring to improve riding comfort. Here, the shock absorber may be a shock absorber of an air suspension.

The suspension device 103 protects the vehicle body by increasing the height of the vehicle on a road with an uneven road surface, and reduces the air resistance by lowering the vehicle height on a road capable of high-speed driving such as a highway, thereby improving driving stability.

The suspension device lowers the damping force of the damper when the road surface is irregular, and increases the damping force of the damper when the road surface is regular.

In addition, the suspension system increases the damping force when the driving speed is high, lowers the damping force when the driving speed is low, increases the damping force on roads with many curves, lowers the damping force on straight roads, and lowers the damping force of the front damper and increases the damping force of the rear damper, during understeer, and increases the damping force of the front damper and lowers the damping force of the rear damper during over-steering.

Such a suspension device can give the driver a hard feeling when increasing the damping force of the damper, and can give the driver a soft feeling when lowering the damping force of the damper.

The engine control device turns on and off the engine based on a start-on-off signal and a pressurization signal of an accelerator pedal.

As shown in FIG. 1 and FIG. 2, the vehicle 1 includes a noise control apparatus (that is, a controller 110), and includes a vibration detector 120 related to the operation of the noise control apparatus, a sound collector 130, an occupant detector 140, and a sound output 150.

Vibration generated in the tire of the wheel due to friction with the road surface is transmitted to the interior of the vehicle 1 through the shock absorber and spring of the suspension device 103, and noise may be generated in the interior of the vehicle 1 due to the transmitted vibration. The noise generated in this way has its own phase.

Accordingly, in order to reduce or eliminate road noise generated on the road and entering the vehicle interior, the noise control apparatus (i.e., the controller 110) generates a noise control signal having a phase opposite to the noise signal for the road surface noise introduced into the vehicle interior (inverse phase) and controls the output of the generated noise control signal.

Here, the out-of-phase signal may be a compensation signal generated by using phase information of a noise signal for indoor noise.

This noise control apparatus (i.e., the controller 110) is also referred to as road-noise active noise control (RANC).

The controller 110 may perform control for noise removal and reduction when the vehicle 1 is started or it is determined that the vehicle is in a driving state.

When the in-vehicle audio device is turned on, the controller 110 may cause the audio signal of the audio device to be mixed with the noise removal signal to be output.

When the audio device is turned off, the controller 110 can output only a noise control signal for noise removal.

The controller 110 can diagnose a failure of a plurality of microphones of the sound collection unit and a plurality of acceleration sensors of the vibration detector 120 when starting is applied to the vehicle. For example, the controller 110 transmits a Keep-Alive Message to a plurality of microphones and a plurality of acceleration sensors, respectively, and diagnoses failures of the plurality of microphones and the plurality of acceleration sensors, respectively, based on whether each microphone and each acceleration sensor respond.

When determining that the at least one microphone has failed, the controller 110 may perform a control operation for removing noise using the microphone in a normal state.

When determining that the at least one acceleration sensor has failed, the controller 110 may perform a control operation for removing noise using the acceleration sensor in a normal state.

The controller 110 may control display of failure information when determining of the failure of at least one microphone or failure of at least one acceleration sensor.

The controller 110 can check the location information of the microphone or acceleration sensor diagnosed as a malfunction, and control the display of the location information of the confirmed microphone or acceleration sensor, and control the display of the visit request information of the service center, and control the display of the location information of the service center.

The controller 110 can control the display of location information of the microphone or acceleration sensor diagnosed as a failure, and also control the display of active noise control performance information. In this case, the display 170 may display images such as 'active noise control performance is degraded due to a failure of the driver's microphone' and 'the passenger seat control performance is reduced due to a failure of the acceleration sensor'.

When controlling the display of fault information, the controller 110 may perform control for removing noise based on the position information of the seat input to the input 160.

When performing the manual mode, the controller 110 may perform control for noise removal based on seat location information and seat-specific passenger key information input to input 160.

When performing the automatic mode, the controller 110 obtains the position information of the seat on which the occupant is boarded and the position information of the occupant's ear from the detection information detected by the occupant detector 140, and performs control for removing noise based on the acquired position information of the seat and the position information of the occupant's ear for each seat.

When the controller 110 determines that the microphone or acceleration sensor have failure, it is also possible to switch from automatic mode to manual mode.

When the controller 110 determines that the microphone or acceleration sensor has failed, it is also possible to control the display of the manual mode change request information.

The controller 110 may switch the noise control mode to the manual mode when input information of the manual mode is received through the input 160.

The controller 110 may be implemented by a memory (not shown) that stores data about an algorithm for controlling the operation of components in the noise control apparatus or a program that reproduces the algorithm, and a processor that performs the above-described operation using data stored in the memory (not shown). In this case, each of the memory and the processor may be implemented as separate chips. Alternatively, the memory and the processor may be implemented as a single chip.

The configuration of this controller 110 will be described later.

The storage 110a can store location information for each seat, ear location information for each age group, and store key information for each age group.

The storage 110a may store location information of a plurality of acceleration sensors, location information of a plurality of microphones, and location information of a plurality of speakers.

The storage 110a can store the location information of the driver's ear, and it is also possible to store the driver's key information.

The storage 110a stores the size, weight, shape, arrangement location, connection information, vehicle body size, weight, shape, arrangement location, and connection information of the vehicle body. That is, storage 110a can store structural information of the vehicle body and chassis.

The storage 110a may store a vehicle structure dynamics database.

The vehicle structure dynamics database may include vehicle structure dynamics information learned using a deep neural network, a surrogate model, and a regression model. That is, storage 110a may store vehicle structural dynamics information based on a deep neural network, a surrogate model, and a regression model.

The storage 110a may be implemented by at least one of nonvolatile memory devices such as cache, Read Only Memory (ROM), Programmable ROM (PROM), Erasable Programmable ROM (EPROM), Electrically Erasable Programmable ROM (EEPROM), and Flash memory, or volatile memory devices such as random access memory (RAM), or a storage medium such as a hard disk drive (HDD) and a CD-ROM, but is not limited thereto. The storage 110a may be a memory implemented as a separate chip from the processor described above with respect to the controller 110, or may be implemented as a processor and a single chip.

The vibration detector 120 detects vibration generated due to friction between the tire of the wheel and the unevenness of the road when the vehicle 1 travels on the road surface.

Here, the vibration is a vibration that the occupant can perceive inside the vehicle 1.

Vibration may occur on the floor of the vehicle 1 inside and outside. The vibration generated at this time can be felt by the occupants.

The vibration detector 120 may detect vibrations generated by factors such as vibrations through the driving of an engine or suspension, or wind noise introduced during driving.

The vibration detector 120 may indirectly detect dynamic forces such as acceleration and impact of the vehicle 1 in order to detect vibration.

The vibration detector 120 may include at least one of an acceleration sensor, a gyro sensor, a motion sensor, a displacement sensor, and a torque sensor.

The vibration detector 120 may transmit a signal for the detected detection information to the controller 110.

When the vibration detector 120 includes an acceleration sensor, the acceleration sensor detects the vertical acceleration and the lateral acceleration of the vehicle, and detects the acceleration of the force that the vehicle tries to push in the lateral direction while driving and the acceleration of the force moving in the vertical direction.

When the vibration detector 120 includes an acceleration sensor, there may be one or a plurality of acceleration sensors. Such an acceleration sensor may be provided on a front axle or suspension.

When multiple acceleration sensors are provided, the plurality of acceleration sensors 121 and 122 may be provided on the left and right sides of the axle 104 connecting the front wheels 101, and may be respectively provided on the suspension device 103 connected to the left and right front wheels.

Here, the left side of the axle 104 may be a position adjacent to the left front wheel among the axles, and the right side of the axle 104 may be a position adjacent to the right front wheel.

The sound collector 130 may be provided in the interior of the vehicle, but may be provided in the headlining of the upper interior of the vehicle, and the sound collector 130 may be provided on at least one of a front windshield, a rear windshield, an overhead console, and a room mirror.

The sound collector 130 may include one or more microphones. When a plurality of microphones are provided in the vehicle, the plurality of microphones 131, 132, 133, and 134 may be provided on the front left and right sides of the headlining and the rear left and right sides of the headlining.

If the vehicle is equipped with multiple microphones, a plurality of microphones 131, 132, 133, 134 are provided on the head lining, but may be provided at a position corresponding to the driver's seat, a position corresponding to the passenger seat, a position corresponding to the left side of the rear seat, and a position corresponding to the right side of the rear seat.

If the vehicle 1 is equipped with multiple microphones, some of the plurality of microphones 131 and 132 may be provided on the left and right sides of the front windshield, respectively, or some can be provided on the left and right sides of the room mirror, or some can be provided on the left and right sides of the dashboard.

The remaining microphones 133 and 134 may be provided on the left and right sides of the rear windshield, respectively, and may be provided respectively on the rear of the backrest of the driver's seat and the passenger seat.

Here, each microphone may be directional.

And each microphone can be implemented as a microphone array.

The sound collector 130 detects noise that the occupants can hear inside the vehicle and outputs a signal corresponding to the detected sound to the controller 110. Here, the noise that the occupant can hear may be a noise inside the vehicle.

The occupant detector 140 may include an image acquisition device that acquires image data inside the vehicle 1. The occupant detector 140 may include one or a plurality of image acquisition devices.

The occupant detector 140 may include a first image acquirer 141 that acquires an image of the front of the interior of the vehicle 1 and a second image acquirer 142 that acquires an image of the rear of the interior of the vehicle 1.

The first image acquirer 141 may be provided on the window glass in the front of the vehicle, but may be provided on the window glass inside the vehicle 1, or may be provided on the room mirror, the steering wheel, or the headlining inside the vehicle. The first image acquirer 141's field of view can be directed towards the driver and passenger seats of the vehicle.

The second image acquirer 142 may be provided on the window glass at the rear of the vehicle, may be provided on the window glass inside the vehicle, or may be provided on the headlining.

The second image acquirer 142's field of view can be directed towards the rear seat (rear seat) of the vehicle.

The first and second image acquirer 141 and 142 include cameras, and may include a CCD or CMOS image sensor, and may include a KINECT (RGB-D sensor), a TOF (Structured Light Sensor), a stereo camera, and the like. It may also include a 3D spatial recognition sensor.

The image sensor may include a plurality of photodiodes that convert light into electrical signals, and the plurality of photodiodes may be arranged in a two-dimensional matrix.

The first and second image acquirer 141 and 142 may be electrically connected to the controller 110. For example, the first and second image acquirers 141 and 142 are connected to the controller 110 through a vehicle communication network (NT), or connected to the controller through a hard wire, or connected to the controller 110 through a printed circuit board (PCB).

The first and second image acquirer 141 and 142 may transmit image data in front of the vehicle 1 and filter image data in the rear to the controller 110.

The occupant detector 140 may include at least one of a weight detector, a pressure detector, a capacitance detector, or a fastening detector of a seat belt for detecting the presence of an occupant according to whether or not to be seated. The occupant detector 140 may be provided on a seat and a seat belt of a vehicle.

The occupant detector 140 may further include at least one of a radar, a light detection and ranging (Lidar) sensor, or an ultrasonic sensor.

As shown in FIG. 3, the first occupant detector 141 of the occupant detector 140 may be provided on a steering wheel or a dashboard to detect a driver and a passenger.

When the first occupant detector 141 is a camera, by acquiring image information of the driver's seat and the passenger's seat, the controller 110 can recognize the boarding of the driver and passengers, and the faces of the driver and passengers can also be recognized.

When the first occupant detector 141 is a radar, information on whether a driver or a passenger is on board may be detected by obtaining distance detection information.

Among the occupant detectors 140, the second occupant detector 142 is provided on the rear of the head lining or the backrest of the driver's seat or passenger seat to detect the occupants of the rear seat.

When the second occupant detector 142 is a camera, the occupant may be detected by acquiring image information of the rear seat, and the occupant's face may also be detected.

When the second occupant detector 142 is a radar, the occupant may be detected by obtaining distance detection information.

The sound output 150 outputs sound in response to the control command of the controller 110.

The sound output 150 can output sound to cancel noise.

The sound output 150 may include one or a plurality of speakers.

When multiple speakers are provided, some of the speakers 151, 152 among the plurality of speakers 151, 152, 153, 154 may be provided in a first pillar disposed between the front left door and the front windshield, a second pillar disposed between the right front door and the front windshield.

Some of the speakers 151 and 152 may be provided inside the driver's seat door and inside the passenger's seat door.

Some of the speakers 153 and 154 may be provided inside the left and right doors of the rear seat, respectively.

The remaining speakers 153 and 154 may be provided in the first pillar disposed between the left front door and the left rear door, and the second pillar disposed between the right front door and the right rear door, respectively.

The remaining speakers 153 and 154 may be provided in the rear left first fender and the rear right second fender, respectively.

The sound output 150 may include an amplifier that amplifies and outputs a compensation signal generated by the controller 110.

The amplifier converts the sound from digital to analog, amplifies it, and outputs it through a speaker.

As shown in FIG. 2, the vehicle may further include an input 160 and a display 170.

The input 160 receives user commands. The input 160 may receive operation commands for various functions that can be performed in the vehicle as a user command. The input 160 may receive a manual mode and an automatic mode among noise control modes. The input 160 may be provided as a touch panel as shown in FIG. 4A, and the input 160 may receive the input information of the button for each seat and may receive boarding information for each seat as a touch signal based on the seat image displayed on the display as shown in FIG. 4B The input 160 may receive key information of an occupant in each seat and age information of an occupant in each seat.

The input 160 can also receive age group information such as newborns, infants, children, adolescents and adults.

As shown in FIG. 4C, the input 160 may be a touch panel, and may receive age group information for each seat as a touch signal. For example, the input 160 may receive on-off information as a touch signal in response to whether a passenger for each seat is a child. That is, the input 160 may receive seat selection information and boarding on or off information of a child. In this case, in response to the input of the seat selection information, the display may display a selection window for selecting the child's boarding on information or off information.

The input 160 may also receive confirmation information corresponding to whether or not failure information of the noise control apparatus is confirmed.

The input 160 may receive an operation command of at least one of a navigation mode and a map display mode. The input 160 can also receive destination information in the navigation mode.

The input 160 can be provided in the head unit and center fascia, may include at least one physical button, such as an operation on-off button for various functions, a button for changing setting values of various functions, and the like, and may further include a jog dial (not shown) or a touch pad for inputting a movement command and a selection command of a cursor displayed on the display 170.

The display 170 displays information on a function being performed in the vehicle and information input by a user.

The display 170 may display location information of each seat and display user input guide information for noise control.

The display 170 may display information input to the input 160, that is, information about whether to board each seat, information about a passenger's height, and information about a passenger's age.

As shown in FIG. 5A and FIG. 5B, the display 170 can also display fault information of the noise control apparatus. That is, the display 170 may display inspection information according to a failure or may display information corresponding to the execution of the fail safe mode.

The display 170 may display a child boarding on/off information window in response to selection of any one of a plurality of seats.

The display 170 may also display selectable information to facilitate user input. For example, the display 170 may display an age selection box displaying a plurality of age information, a key selection box displaying a plurality of key information, and a seat selection box displaying location information of a plurality of seats.

The age selection box may display an age selection box such as Term newborn infants, infants, children, adolescents, and adults. The display 170 displays information about audio, video, navigation, DMB and radio functions.

The display 170 displays a map image within a certain range from the current location of the vehicle in the map display mode, displays map information in which route information from the current location to the destination is matched in the navigation mode, and displays road guidance information.

The input 160 and the display 170 may be user interfaces (UI). Display 170 may include a display panel, and input 160 may include a touch panel. That is, a touch screen in which the touch panel is integrated with the display panel may be provided.

The display 170 may be provided on a head unit or a vehicle terminal.

Figure 6:
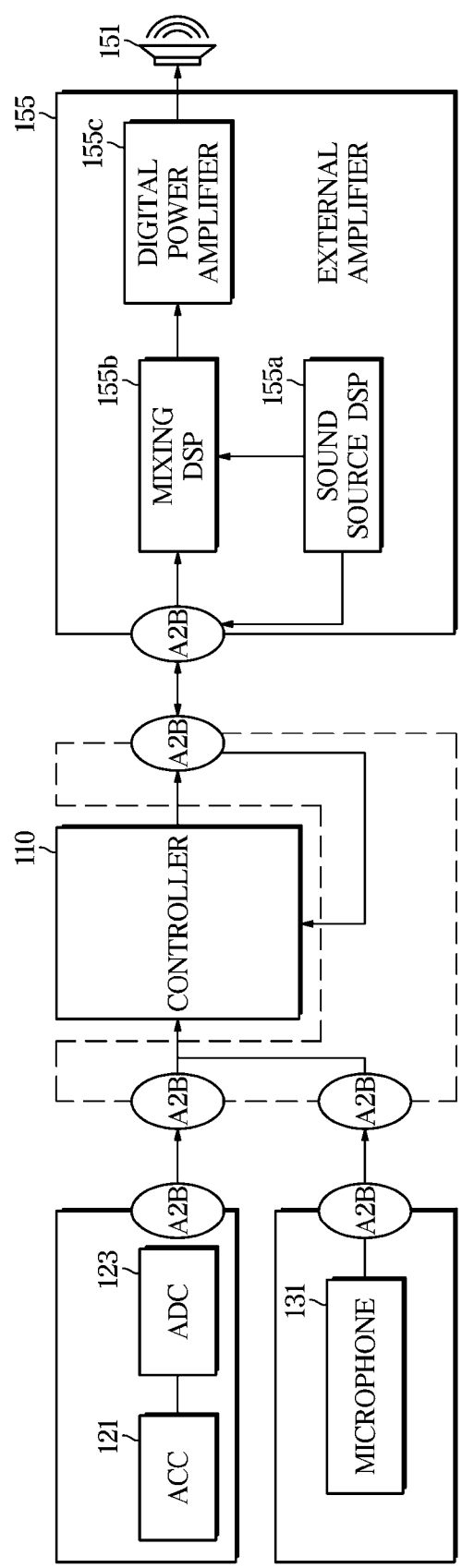
FIG. 6 is an exemplary diagram of signal processing by a noise control apparatus according to an embodiment.

FIG. 6 is an exemplary diagram of signal processing by a noise control apparatus according to an embodiment.

The acceleration sensor 121 may convert an acceleration signal that is an analog signal into a noise signal that is a digital signal and then transmit the converted noise signal to the controller 110. To this end, the acceleration sensor may include an analog to digital converter (ADC) 123. Here, the analog-to-digital converter 123 may be provided in the controller 110.

The controller 110 may be connected through a plurality of acceleration sensors connected in a daisy chain and a vehicle audio bus (hereinafter, referred to as A2B).

The controller 110 may receive the acceleration signal output from the acceleration sensor among the vibration detector 120 as a reference signal. The controller 110 may be connected to a plurality of microphones connected in a daisy chain through an automotive audio bus (A2B) (hereinafter, referred to as A2B).

A master-slave line topology can be used to transfer audio and control data along with clock and power on a single two-wire of the vehicle audio bus (A2B).

The controller 110 can receive feedback from the error signal output from the sound collector 130.

The controller 110 uses the vibration detector 120 to recognize vibrations that cause indoor noise in advance, recognizes the indoor noise using the sound collector 130, and generates a noise control signal for removing noise based on a noise signal (i.e., a reference signal) for the recognized vibration and a noise signal (error signal) for the recognized noise.

The noise collected by the sound collector 130 may be the remaining noise that cannot be removed by the controller among the noise generated by vibration. Here, the noise collected by the sound collector is referred to as error noise or residual noise.

The noise collected by the sound collector 130 may be used as information for determining whether noise in the vehicle 1 is normally reduced or removed.

The controller 110 receives the image information of the occupant detector 140 and processes the received image information to check the presence of occupants for each seat, and may recognize a face based on image information corresponding to a seat on which the occupant is boarded, and obtain location information of the occupant's ear based on the face information of the recognized face.

The controller 110 may obtain location information of a quiet zone based on location information of the occupant's ear and output a noise control signal based on the obtained location information of the quiet zone.

In order to collect noise that may occur in the quiet zone, the controller 110 may generate a virtual microphone in the quiet zone and obtain a virtual error signal for the noise collected by the virtual microphone. In one example, a virtual microphone may mimic a sound or noise receiver, such as a microphone, disposed in the quiet zone to obtain/generate a virtual error signal indicating the noise in the quiet zone, as a microphone does if the microphone is disposed in the quiet zone and receives the noise in the quiet zone to generate an error signal indicating the noise.

In one example, a virtual signal may refer to a signal input to, output from, or generated by a virtual device which mimics functions of a device, if such as a device is disposed in a corresponding location. In another example, a virtual signal may refer to a signal input to, output from, or generated by a hardwired device including, but not limited to, a circuit, a signal generator, or a controller including a processor. Alternatively, a virtual signal may correspond to a signal input to, output from, or generated by a hardwired device including, but not limited to, a circuit, a signal generator, or a controller including a processor. In one example, a virtual device or virtual devices including, but not limited to, a virtual microphone, a virtual reference signal generator, and a virtual error signal generator, in conjunction with another device or other devices, may be implemented with a circuit or a processor. Such a processor, when executing software stored in a non-transitory computer-readable medium, may perform operations/functions of the virtual device(s), as well as operations/functions of the other device(s). However, the present disclosure is not limited thereto, and the virtual signal and the virtual device may be implemented differently.

The controller 110 may generate a virtual microphone based on the location information of the occupant's ear.

The controller 110 generates a virtual acceleration signal based on the acceleration signal output from the acceleration sensor, acquires a virtual reference signal corresponding to the generated virtual acceleration signal, and generates a noise control signal based on the acquired virtual reference signal and the acquired virtual error signal.

A control algorithm of the controller 110 that generates a noise control signal based on the virtual reference signal and the virtual error signal will be described later.

The virtual acceleration signal may be an acceleration signal detected by a virtual acceleration sensor disposed at a virtual location. The virtual location may be a location where vibration occurs most or a location where noise occurs most among the locations of the vehicle.

The controller 110 can mix a noise control signal and a sound source (i.e., an audio signal) and output it through the speaker of the sound output 150.

The controller 110 may include a plurality of digital signal processing units (ARNC DSP) and a plurality of A2B communication interfaces.

Since the noise control apparatus according to the present exemplary embodiment performs digital communication using A2B, in-vehicle wiring costs for signal transmission can be minimized.

The controller 110 may transmit and receive signals to and from the amplifier 155 through A2B.

The controller 110 may generate a digital noise control signal using an error signal and a reference signal, and transmit the generated digital noise control signal to the amplifier 155 through A2B communication.

The amplifier 155 may include a digital signal processor 155b for mixing digital sound source provided from sound source digital signal processor (sound source DSP, 155a) that provides digital sound source and digital noise control signal received from controller 110 for mixing to generate a digital active noise control sound by mixing, a digital power amplifier 155c that converts the digital active noise control sound to digital-analog, amplifies it, and outputs it through the speaker 151.

The active noise control sound output through the digital power amplifier 155c may be input back to the microphone and fed back to the controller 110.

The amplifier 155 may generate a mixing signal by mixing the noise control signal with an audio signal corresponding to a digital sound source, and amplify and output the mixed signal.

The amplifier 155 may include an amplifier stage (not shown) for amplifying the audio signal obtained by mixing the noise control signal as a mixed signal. In this case, the amplification stage may include a vacuum tube or a transistor for amplifying the power of the mixing signal, which is an electrical signal.

The mixing signal amplified by the amplifier 155 may be transmitted to the speakers 151-154.

The speakers 151-154 may reduce or remove indoor noise in the vehicle 1 by outputting the amplified mixing signal from the amplifier 155. In this case, the phase of the noise signal generated in the interior of the vehicle 1 and the phase of the audio signal mixed with the noise control signal may be opposite to each other. As a result, noise signals generated indoors may be attenuated. Thus, noise in the vehicle 1 can be reduced or eliminated.

At least one component may be added or deleted corresponding to the performance of the components of the noise control apparatus shown in FIG. 6. In addition, it will be readily understood by those of ordinary skill in the art that the mutual positions of the components may be changed corresponding to the performance or structure of the noise control apparatus.

Figure 7:
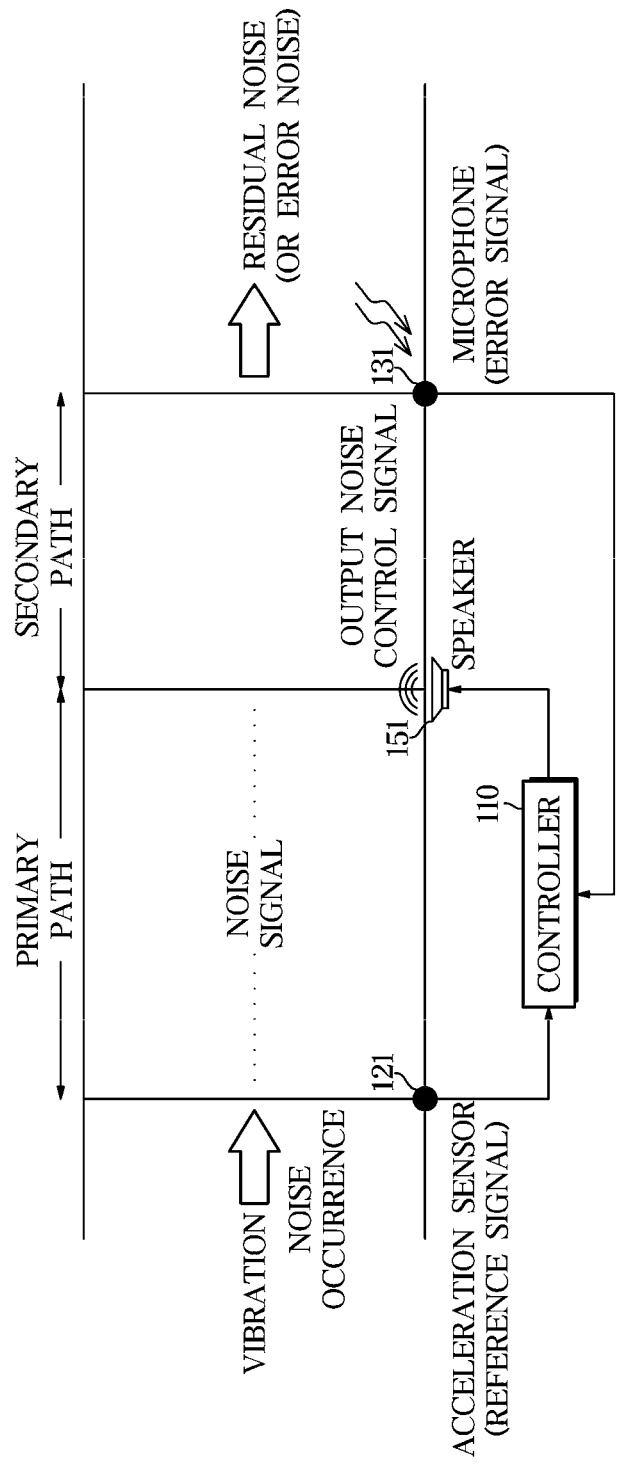
FIG. 7 is a diagram illustrating a noise removal principle of a noise control apparatus according to an embodiment.

FIG. 7 is a diagram illustrating a noise removal principle of a noise control apparatus according to an embodiment. That is, FIG. 7 is a diagram for explaining a control principle of a controller that removes noise based on a signal output from an actual acceleration sensor and an actual microphone.

The controller 110 obtains a reference signal based on the acceleration signal detected by the acceleration sensor 121 and generates an inverse phase signal (i.e., a noise control signal) for removing noise from the obtained reference signal.

In this case, the controller 110 may output a sound corresponding to the generated noise control signal through the speaker 151.

The controller 110 acquires a path from the location where the acceleration sensor 121 is installed to the speaker 151 from which sound is output as a primary path, and acquires a path from a location where the speaker 151 is installed to a location where the microphone 131 is installed as a secondary path.

The position where the speaker is installed may be a position where noise is removed, and the position where the microphone is installed may be a position where residual noise is collected. That is, the secondary path may not be removed by the sound output from the speaker and may be a path in which noise exists before being collected by the microphone after remaining.

Based on this principle, the controller 110 can acquire a virtual secondary path based on a signal output from a virtual acceleration sensor and a virtual microphone, and remove noise from the acquired virtual secondary path.

More specifically, the controller 110 generates a virtual acceleration sensor based on the acceleration signal of the actual acceleration sensor, the structure information of the vehicle body and the structure information of the vehicle body, acquires a virtual reference signal based on the generated acceleration signal of the virtual acceleration sensor, generates a virtual reverse phase signal to remove noise caused by the acquired virtual reference signal. In this case, the controller may output a sound corresponding to the generated virtual out-of-phase signal through the speaker.

The controller 110 may obtain a path from the location of the virtual acceleration sensor to the speaker outputting sound as a virtual primary path.

The controller 110 creates a virtual microphone based on the location information or key information of the passenger's ear, acquires a virtual secondary path from the position of the speaker to the position of the virtual microphone, and generates a virtual error signal based on the acquired virtual secondary path.

The controller 110 may generate a noise control signal based on a virtual error signal and a virtual reference signal.

Here, the location where the virtual microphone is installed may be a location where residual noise is collected.

A control algorithm of the controller generating the noise control signal based on a virtual secondary path, a virtual error signal and a virtual reference signal will be described with reference to FIG. 8.

Figure 8:
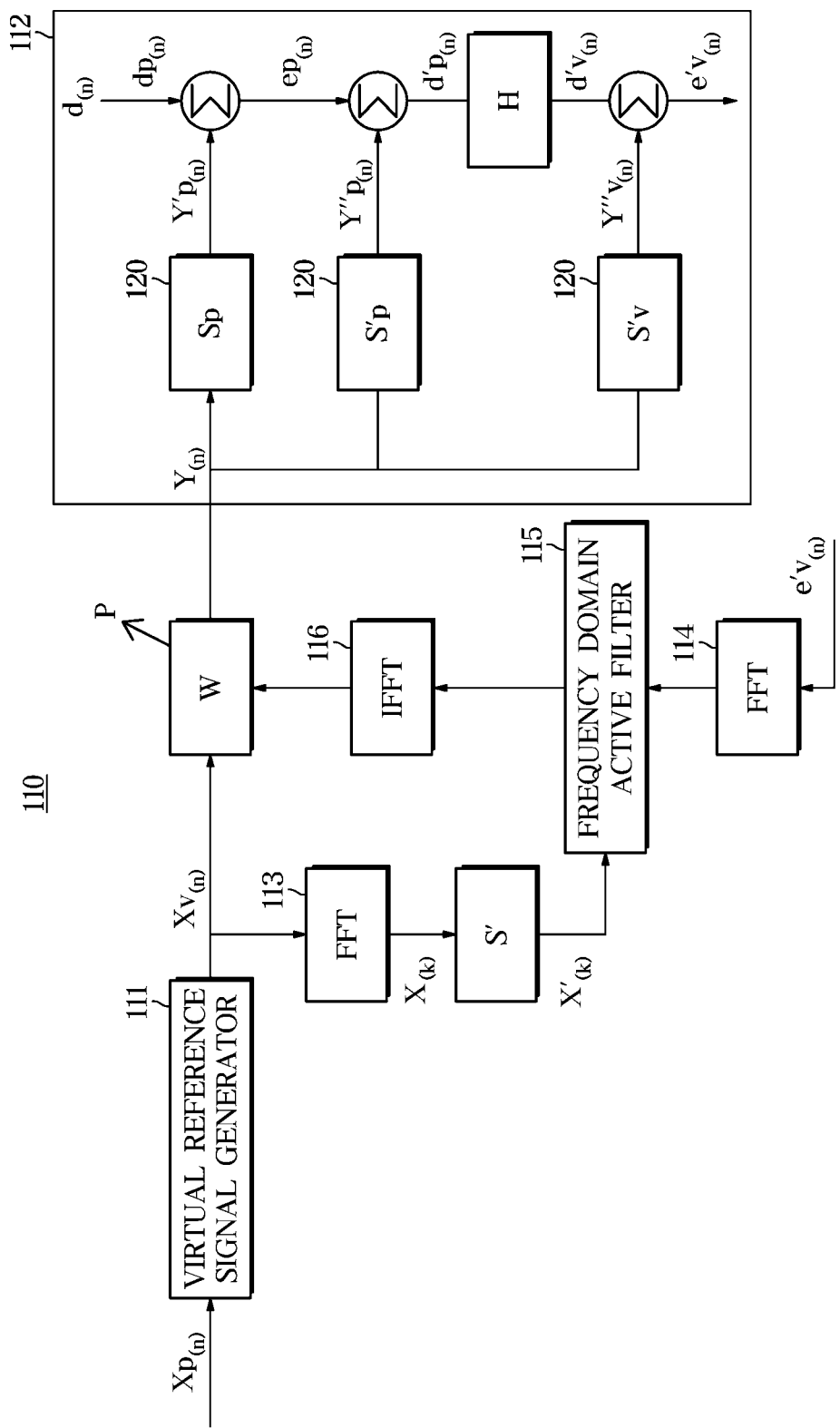
FIG. 8 is a block diagram of a control algorithm for generating a noise control signal in a noise control apparatus according to an embodiment.

FIG. 8 is a control algorithm of the controller 110 generating a noise control signal based on a virtual reference signal and a virtual error signal.

The controller 110 may include virtual reference signal generator 111, active noise controller W, second path model S', virtual error signal generator 112, FFT (fast Fourier transformation) 113, 114, and Frequency domain active filter 115 and IFFT (inverse fast Fourier transformation) 116.

Figure 9:
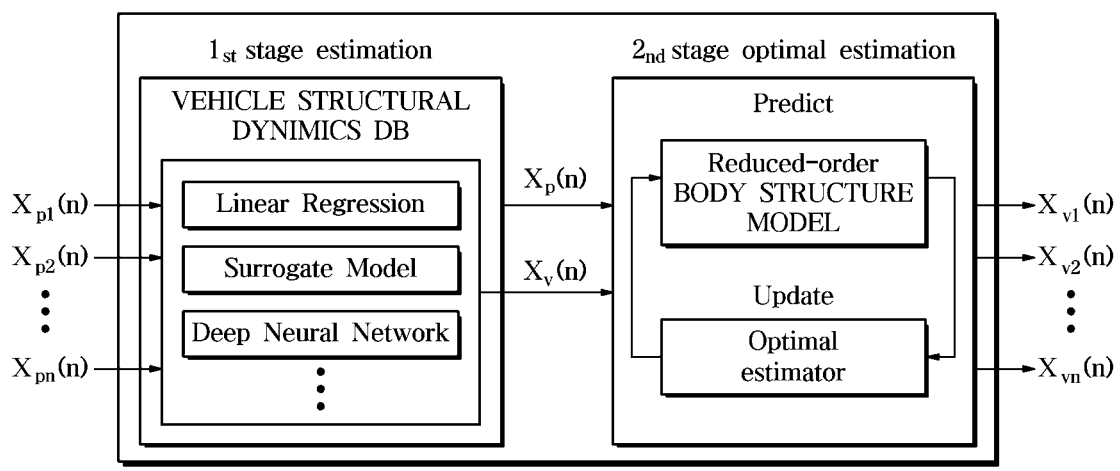
FIG. 9 is an exemplary diagram illustrating generation of a virtual reference signal in a noise control apparatus according to an embodiment.

As shown in FIG. 9, when a plurality of actual acceleration signals detected by a plurality of acceleration sensors are received, the virtual reference signal generator 111 is an actual reference signal corresponding to the received plurality of actual acceleration signals (Xp(n)).

The actual reference signal Xp(n) may be a sum of a plurality of acceleration signals.

The virtual reference signal generator 111 acquires the position of the virtual acceleration sensor using the actual reference signal and the vehicle structure dynamics database stored in storage 110a and generates a virtual reference signal corresponding to the acquired position of the virtual acceleration sensor.

The virtual reference signal generator 111 may generate an optimal virtual reference signal using a Kalman filter-based optimal prediction algorithm (a vehicle body structure model and an algorithm of an estimation unit) on the virtual reference signal. At this time, the optimal virtual reference signals generated may be generated respectively corresponding to the positions of the virtual acceleration sensors.

The prediction accuracy of a virtual reference signal can be improved by using the Kalman filter-based optimal prediction algorithm (the vehicle body structure model and the algorithm of the estimation unit).

The second path model S' may include a function for generating a second path for the virtual acceleration signal generated by the virtual acceleration sensor.

The second path model S' acquires a reference signal X'(k) in the secondary path based on the reference signal X(k) obtained by fast Fourier transform and the second path model S'.

The active noise controller W generates a final noise control signal based on a virtual reference signal and a virtual error signal, and outputs the generated noise control signal Y(n).

The virtual error signal generator 112 includes a preset secondary path Sp, an actual secondary path S'p, a virtual secondary path S'v, and a transfer function H.

When the preset secondary path Sp receives the noise control signal (Y(n)) output from the active noise controller W, a noise control signal Y'p(n) in a preset second path is generated and output based on a preset second path function.

The actual secondary path S'p may include a function for generating an actual secondary path based on the location information of the microphone obtained by the image information.

When the noise control signal (Y(n)) output from the active noise controller W is received, the actual secondary path S'p generates and outputs the noise control signal Y"p(n) in the actual secondary path based on the actual secondary path function.

The virtual secondary route S'v may include a function for generating a virtual secondary route for each seat based on at least one of the location information of the occupant's ear and the key information of the occupant, which are detection information detected by the occupant detector.

The virtual secondary route S'v may include a function for changing a virtual secondary route for each seat corresponding to a change in the position of the occupant based on detection information detected by the occupant detector.

When the noise control signal (Y(n)) output from the active noise controller W is received, the virtual secondary path S'v generates and outputs a noise control signal Y"v(n) in the virtual secondary path based on the virtual secondary path function.

The virtual secondary route S'v may include a function for generating a virtual secondary route for each seat based on at least one of the passenger's key information for each seat, the passenger's age information, and the passenger's age group information entered in the input.

The detection information detected by the occupant detection unit may include location information of the occupant's ear obtained by image information, and key information of the occupant detected by a radar.

The virtual error signal generator 112 generates an error signal ep(n) remaining indoors based on the noise control signal (Y'p(n)) of the preset secondary path and the actual noise signal (d(n)) collected by the microphone.

The virtual error signal generator 112 generates a noise control signal (Y"p(n)) in the actual secondary path (S'p) based on the noise control signal (Y(n)) and the actual secondary path (S'p), and acquires an actual noise signal d'p(n) collected by an actual microphone based on the obtained noise control signal (Y"p(n)) and error signal (ep(n)) in the actual secondary path (S'p).

The virtual error signal generator 112 acquires a virtual noise signal d'v(n) collected by the virtual microphone based on the transfer function (H) and the actual noise signal (d'p(n)) collected by the actual microphone.

The transfer function H may be a transfer function between an actual secondary path to an actual microphone and a secondary path to a virtual microphone.

The virtual error signal generator 112 may generate a virtual error signal e'p(n) based on the obtained noise control signal (Y'v(n)) in the virtual secondary path (S'v) and the noise signal (d'v(n)) collected from the virtual microphone.

The signals generated by the virtual error signal generator 112 are as follows.

$$d'p(n)=ep(n)-Y''p(n)=ep(n)-S'p*Y(n)$$

$$d'v(n)=H*d'p(n)$$

$$e'v(n)=d'v(n)+Y''v(n)=H*d'p(n)+S'v*Y(n)$$

$$e'v(n)=H[ep(n)-S'p*Y(n)]+S'v*Y(n)$$

The virtual error signal generator 112 may generate a virtual error signal e'p(n) based on the obtained noise control signal (Y'v(n)) in the virtual secondary path (S'v) and the noise signal (d'v(n)) collected from the virtual microphone.

The first fast Fourier transformer (FFT) 113 performs a fast Fourier transform on the virtual reference signal Xv(n).

The second fast Fourier transformer (FFT) 114 performs a fast Fourier transform on the virtual error signal e'p(n).

The frequency domain active filter 115 filters the virtual error signal e'p(n) generated by the fast Fourier transform and the reference signal X'(k) generated by the fast Fourier transform.

The inverse fast Fourier transformer 116 performs inverse fast Fourier transform on the signal filtered by the frequency domain active filter 115. That is, the inverse fast Fourier transform unit 116 may transform the filtered signal from the frequency domain to the time domain.

After performing IFFT on the highly filtered signal, the signal generated by the IFFT is transferred to the adaptive active filter (W).

The adaptive active filter W may control an output of a signal received from the inverse fast Fourier transformer 116.

The control algorithm of such a controller can improve a secondary path that actively changes according to a position change of the occupant's ear, particularly, a high frequency control performance of 300 Hz or more.

The control algorithm shown in FIG. 8 is an example of a single-channel feed forward filter-x LMS.

In addition, multi-channel structures with many additional channels, many additional microphones, and many additional speakers may also be employed and an algorithm for this may be employed.

Figure 10:
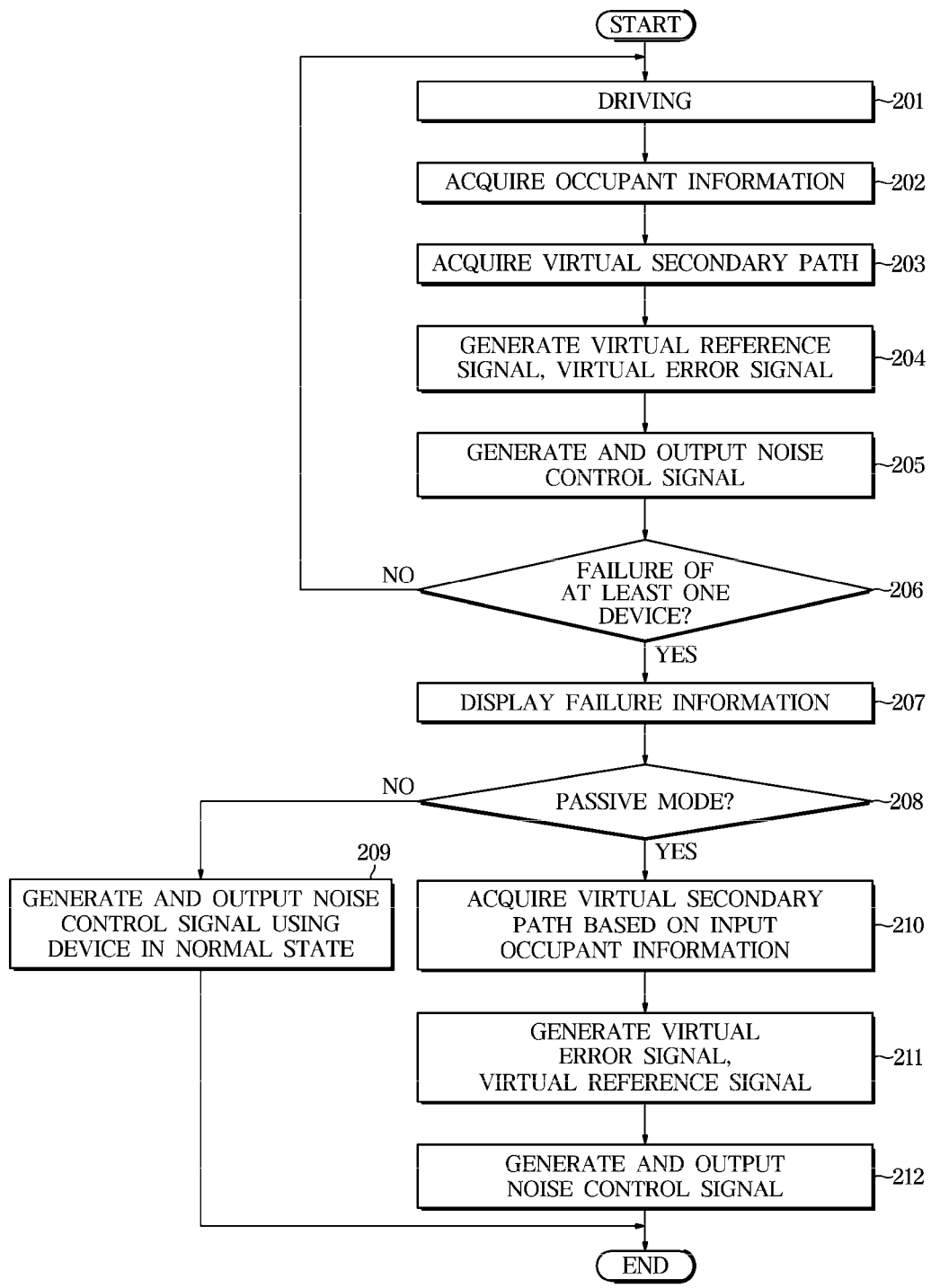
FIG. 10 is a flowchart illustrating a vehicle control according to an exemplary embodiment.

FIG. 10 is a flowchart illustrating a vehicle control according to an exemplary embodiment.

When the vehicle is started and it is determined that it is in the driving state (201), the vehicle acquires information of the occupant (202).

It is also possible for the vehicle to obtain information on the occupant when the vehicle is started.

Here, acquiring the occupant's information includes acquiring the position information of the seat on which the occupant is boarded and the position information of the occupant's ear from the detection information detected by the occupant detector 140.

When the occupant detector 140 is a camera, the vehicle may recognize the occupant's boarding by acquiring image information of the driver's seat, the passenger's seat, and the rear seat, and obtain location information of the occupant's ear.

If the occupant detector 140 is a radar, by acquiring distance detection information, the vehicle may acquire information on whether or not the occupant is on board and the key of the occupant, and acquire location information of the occupant's ear from the acquired key of the occupant.

The vehicle may acquire an actual secondary route based on the actual location information of the microphone, which is a sound collector, and obtain a virtual secondary route based on the location information of the occupant's ear (203). This will be described with reference to FIGS. 11A, 11B and 11C.

Figure 11A:
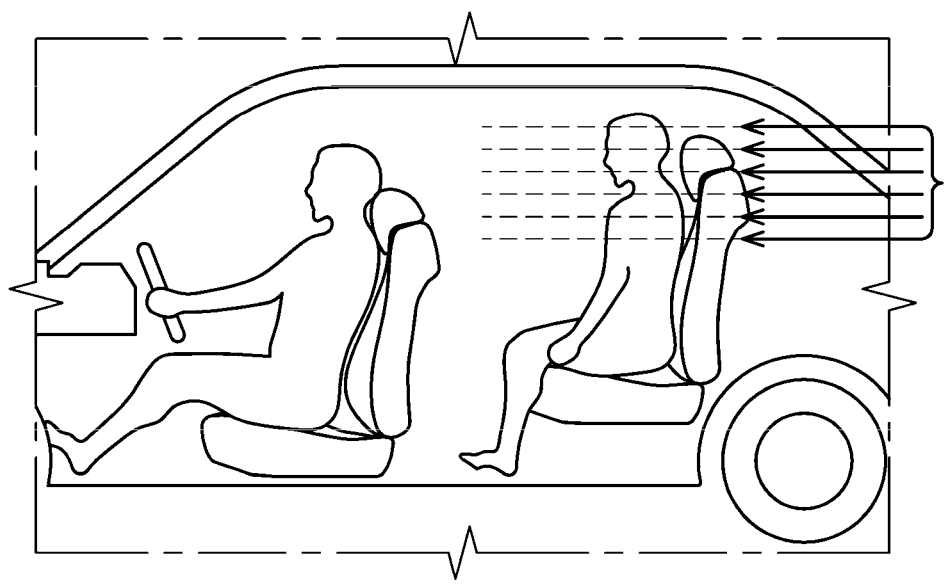
FIGS. 11A, 11B, and 11C are diagrams illustrating acquisition of a virtual secondary path in a noise control apparatus in a vehicle according to an embodiment.

As shown in FIG. 11A, the vehicle may acquire an actual secondary path based on the actual microphone position.

Figure 11B:
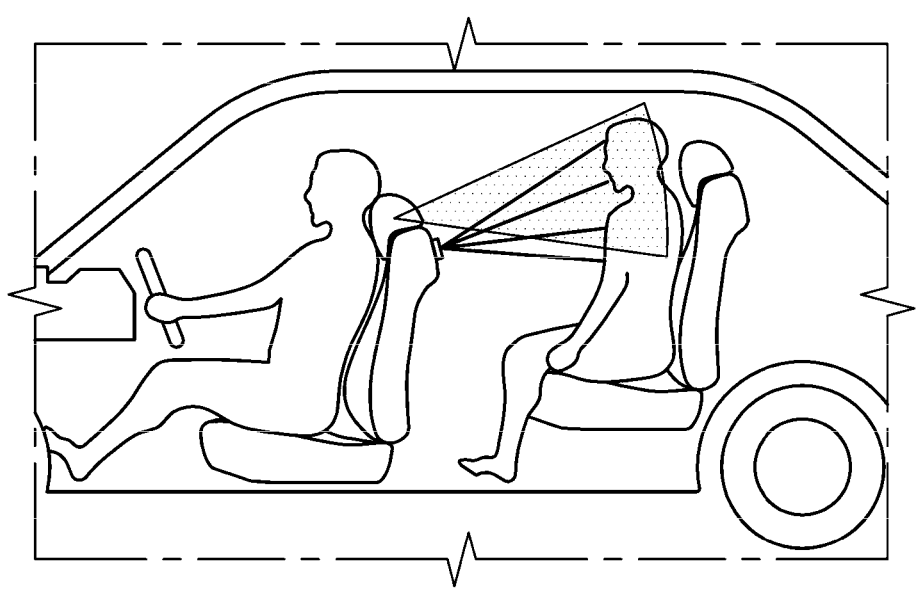

As shown in FIG. 11B, the vehicle may acquire occupant information based on the detection information of the occupant detector 140.

Figure 11C:
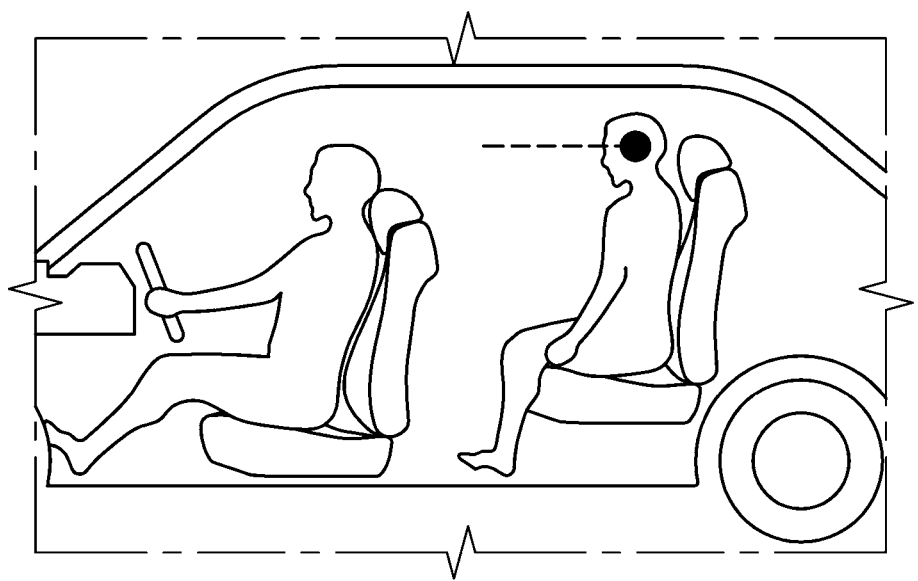

As illustrated in FIG. 11C, the vehicle may acquire location information of the occupant's ear and acquire a virtual secondary path based on the acquired location information of the ear.

The vehicle may generate a virtual error signal based on the noise signal collected by the microphone and the virtual secondary path.

The vehicle may generate a virtual acceleration sensor and generate a virtual reference signal detected by the generated virtual acceleration sensor based on the location information of the actual acceleration sensor, which is a vibration detector, and the structure information of the vehicle (204).

The vehicle generates a noise control signal based on the virtual reference signal and the virtual error signal, and outputs a sound for the generated noise control signal through a speaker (205).

The vehicle acquires occupant information periodically or in real time, and checks the change in the position of the occupant's ear from the acquired occupant's information, generates a virtual microphone based on the confirmed ear position change, generates a virtual error signal collected by the generated virtual microphone, and generates a noise control signal based on the generated virtual error signal, thereby removing noise inside the vehicle in response to a change in a passenger's riding posture.

For example, if the vehicle determines that the position of the ears has changed due to the change of the passenger's riding posture in the passenger seat, the vehicle generates a virtual error signal based on the position information of the passenger's ear in the passenger seat, and generates a noise control signal based on the generated virtual error signal, and outputs the sound for the generated noise control signal through a speaker provided on the passenger side.

The vehicle diagnoses a failure of at least one of the plurality of microphones and the plurality of acceleration sensors, and when the vehicle determines that the at least one device has failed (206), the vehicle displays failure information of the at least one device that has failed (207).

Here, the device includes a plurality of microphones and a plurality of acceleration sensors.

That is, if the vehicle is diagnosed as a failure of at least one microphone among a plurality of microphones, it is possible to display failure information of at least one microphone that has failed, and it is also possible to display repair request information.

If the vehicle is diagnosed as a failure of at least one acceleration sensor among the plurality of acceleration sensors, the vehicle may display failure information of at least one acceleration sensor that has failed, and may display repair request information.

The vehicle determines whether the manual mode is received through the input (208), and if it is determined that the manual mode has not been input, the vehicle performs the automatic mode.

That is, the vehicle generates a noise control signal using a device in a normal state, and outputs a sound corresponding to the generated noise control signal through a speaker (209).

More specifically, if the vehicle is diagnosed with a failure of at least one of the plurality of acceleration sensors, the vehicle generates a virtual acceleration sensor based on the position information of any one of the acceleration sensors in a normal state, generates a noise control signal based on the virtual reference signal detected by the generated acceleration sensor, and outputs a sound corresponding to the generated noise control signal through a speaker.

When it is diagnosed as a failure of at least one of the plurality of microphones, based on the location information of any one of the microphones in a normal state, the vehicle generates a virtual microphone, generates a noise control signal based on the virtual error signal collected by the generated virtual microphone, and outputs a sound corresponding to the generated noise control signal through a speaker.

When it is determined that the manual mode has been received through the input, the vehicle performs the manual mode. In this case, the vehicle may display information requested for input of information of passengers for each seat through the display.

When the information of the occupant for each seat is received through the input, the vehicle checks the received information of the occupant for each seat and acquires position information of the ear of the occupant for each seat based on the checked information of the occupant for each seat.

Here, checking the information of the occupants for each seat includes checking the age range of the occupants for each seat. At this time, the vehicle may check the key information of the occupant for each seat corresponding to the age group for each seat from the information stored in the storage unit, and acquire the position information of the ear of the occupant for each seat based on the predicted key information of the occupant for each seat.

For example, when the selection information on the left side of the rear seat is received through the input and the selection information of the child is received, the vehicle may obtain ear position information corresponding to the child from information stored in the storage.

Checking the information of the passenger for each seat may include checking the key information of the passenger for each seat.

The vehicle may acquire passenger information for each seat through the camera of the passenger detector.

The vehicle may acquire a virtual secondary route based on the occupant's ear position information for each seat and the acquired occupant's ear position information based on the seat occupant information input through the input (210).

Based on the location information of the failed device, the vehicle checks the device in a normal state closest to the failed device, and generates a virtual reference signal and a virtual error signal for each seat based on the confirmed location information of the device in a normal state and the location information of the passenger's ear for each seat.

When the microphone is in failure, the vehicle generates a virtual microphone based on the location information of the microphone in a normal state and the location information of the passenger's ear, and regenerates a virtual secondary path based on the location information of the virtual microphone.

For example, the vehicle may generate a virtual microphone and generate a virtual secondary route when an occupant exists in the occupant seat while the microphone provided in the passenger seat is in failure based on the position information of the ear of the occupant on board the passenger seat, and the position information of the ear of the occupant in the passenger seat obtained, and the position information of the microphone in the normal state placed closest to the microphone of the passenger seat.

That is, the vehicle may generate a virtual error signal based on a virtual secondary path and a noise signal collected by the microphone in a normal state.

The vehicle can post-process the noise signal received by the failed microphone when generating a virtual error signal. For example, it is possible to remove the noise signal received from a failed microphone.

When generating a virtual error signal, the vehicle may post-process the reference signal received by the failed acceleration sensor. For example, a reference signal received from a failed acceleration sensor can be removed.

When the acceleration sensor is in failure, the vehicle generates a virtual acceleration sensor based on the position information of the acceleration sensor and the vehicle structure information in a normal state, and generates a virtual reference signal detected by the generated virtual acceleration sensor (211).

The vehicle generates a noise control signal based on a virtual reference signal and a virtual error signal, and outputs a sound for the generated noise control signal through a speaker (212).

According to the present disclosure, noise can be removed by focusing on a desired seat by manual operation through the display unit.

According to the present embodiment, by transmitting information on a hand signal recognized by a terminal or personal mobility to a surrounding vehicle, a surrounding infrastructure, and a server, a communication function for a road situation and a traffic situation can be performed in connection with other devices in the surroundings.

As described above, the present embodiment can improve the quality and product-ability of the terminal and personal mobility by providing signals to other users, and further increase the user's satisfaction and secure the competitiveness of the product.

The aforementioned present disclosure can also be embodied as computer-readable code stored on a non-transitory computer-readable recording medium. The non-transitory computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

The controller may be implemented by a processor that performs the above-described operations by executing the computer-readable code stored on the non-transitory computer-readable recording medium.

In accordance with an aspect of the present disclosure, it may be possible to provide a vehicle and a controlling method thereof capable of providing efficient autonomous driving by changing the detection range and power consumption of the sensor according to the speed of the vehicle.

The present disclosure can reduce the road surface noise felt by a vehicle occupant while driving by outputting a noise control signal of an inverse phase for noise generated by friction with the road surface through a speaker. The present disclosure can improve the quietness of a vehicle.

The present disclosure can lead to the use of sales outlets by developing a vehicle that can maintain better quietness in future autonomous vehicles, and can increase synergy effects by fusion with other technologies. That is, the present disclosure can also be utilized in an audio system.

The present disclosure is economical because it is possible to reduce road noise through software control through a digital signal processor (DSP) without using hardware such as sound absorbing and insulating agents or low noise tires. In addition, through this, the present disclosure can reduce the vehicle weight, thereby improving driving fuel economy.

The performance of load noise control can be improved by actively removing noise using an acceleration sensor or a microphone in a steady state, or removing noise through a manual setting in failure of at least one of the acceleration sensor and the microphone.

The present disclosure enables a user to easily recognize a failure by outputting guidance information in case of failure of at least one of an acceleration sensor and a microphone, thereby improving user satisfaction.

The present disclosure can escape from the existing layout constraints of installing an acceleration sensor in a place with strong vibration. That is, in the present disclosure, since noise can be removed based on the acceleration signal generated at the position of the virtual acceleration sensor, it is easy to install the acceleration sensor and furthermore, it is easy to manufacture a vehicle.

The present disclosure can provide great convenience to the user, improve the marketability of a vehicle, and further increase the user's satisfaction, improve user convenience and reliability, and secure product competitiveness.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A noise control apparatus, comprising:
   a virtual reference signal generator configured to generate a virtual reference signal based on a vibration signal indicating vibration detected by a vibration detector and a structure information of a vehicle body;
   a virtual error signal generator configured to generate a virtual microphone based on an occupant information detected by an occupant detector, and generate a virtual error signal based on a virtual noise signal collected from the generated virtual microphone and an actual noise signal collected from an actual microphone; and
   an active noise controller configured to generate a noise control signal based on the virtual error signal and the virtual reference signal and control an output of the generated noise control signal,
   wherein, when diagnosing a failure of at least one of the vibration detector and the actual microphone, the active noise controller controls a display to display request information for input of occupant information for each seat,
   wherein the virtual error signal generator generates the virtual microphone based on seat-specific occupant information received by an input.

2. The noise control apparatus according to claim 1, further comprising:
   a fast Fourier transformer configured to fast Fourier transform the virtual reference signal, and fast Fourier transform the virtual error signal;
   a frequency domain active filter configured to filter the fast Fourier transformed virtual reference signal and the fast Fourier transformed virtual error signal; and
   an inverse fast Fourier transformer configured to inverse Fourier transform the signal filtered by the frequency domain active filter and transfer the inverse Fourier transformed signal to the active noise controller.

3. The noise control apparatus according to claim 1, wherein the virtual error signal generator acquires an actual secondary path based on the location information of the actual microphone and the noise signal collected from the actual microphone, generates a noise signal in the actual secondary path based on the noise control signal outputted from the active noise controller and the actual secondary path, and acquires the virtual noise signal in a virtual secondary path based on the noise control signal outputted from the active noise controller and the virtual secondary path.

4. The noise control apparatus according to claim 3, wherein the virtual error signal generator includes a transfer function that subtracts the noise signal from the virtual second path from the noise signal from the actual second path.

5. The noise control apparatus according to claim 1, wherein the virtual error signal generator periodically receives the occupant information detected by the occupant detector, and determines a change in the occupant's boarding posture based on the periodically received occupant information, and generates the virtual microphone when it is determined that the occupant's boarding posture changes.

6. A vehicle, comprising:
   a display;
   an input configured to receive a user input;
   a sound collector configured to collect sound and output a virtual noise signal for the collected sound;
   a vibration detector configured to detect vibration and output an actual reference signal for the detected vibration;
   an occupant detector configured to detect an occupant and output occupant information on the detected occupant; and
   a controller configured to generate a virtual reference signal based on the actual reference signal, acquire location information of the occupant's ear based on the occupant information, generate a virtual error signal based on the acquired ear location information, generate a noise control signal based on the virtual error signal and the virtual reference signal, and control an output of the generated noise control signal,
   wherein, when diagnosing a failure of at least one of the vibration detector and the sound collector, the controller controls the display to display request information for input of occupant information for each seat, generates a virtual microphone based on seat-specific occupant information received by the input, and generates the virtual error signal based on a virtual noise signal collected from the generated virtual microphone.

7. A vehicle, comprising:
a display;
an input configured to receive a user input;
a plurality of microphones provided at different locations in the vehicle;
a plurality of acceleration sensors provided at different locations in the vehicle; and
a controller configured to diagnose failures of the plurality of acceleration sensors and the plurality of microphones, and generate a virtual reference signal using the remaining acceleration sensors when diagnosing a failure of at least one of the plurality of acceleration sensors, and generate a noise control signal using the remaining microphones when diagnosing a failure of at least one of the plurality of microphones;
wherein, when diagnosing the failure of at least one of the plurality of acceleration sensors or diagnosing the failure of at least one of the plurality of microphones, the controller controls the display to display request information for input of occupant information for each seat, and generates a virtual microphone based on seat-specific occupant information received by the input.

8. The vehicle according to claim 7, wherein the controller post-processes an acceleration signal received from the acceleration sensor diagnosed as a failure, and post-processes the noise signal received from the at least one microphone diagnosed as a failure.

9. The vehicle according to claim 7,
wherein the controller controls the display to display information on the microphone diagnosed as the failure or the acceleration sensor diagnosed as the failure.

10. The vehicle according to claim 7, wherein the controller generates a virtual error signal by using a microphone provided at a location closest to a microphone diagnosed as a failure among the remaining microphones, and generates a virtual reference signal using an acceleration sensor provided at a location closest to an acceleration sensor diagnosed as a failure among the remaining acceleration sensor.

11. The vehicle according to claim 7, wherein the occupant information includes occupant identification information, occupant height information, occupant age information, or occupant age-specific information.

12. The vehicle according to claim 6, wherein the occupant detector further includes at least one image acquirer acquires an indoor image, and
wherein the controller acquires location information of the occupant's ear based on the indoor image.

13. The vehicle according to claim 6, wherein the controller generates an actual secondary path to an actual microphone, generates an actual noise signal in the generated secondary path, generates a virtual secondary path to the virtual microphone, generates a virtual noise signal in the generated virtual secondary path, and generates the virtual error signal based on the actual noise signal and the virtual noise signal.

14. The vehicle according to claim 6, wherein the controller further comprising: an amplifier (AMP) configured to mix a received audio signal and the noise control signal in respond to the received audio signal, and output the mixed signal.

15. The vehicle according to claim 6, further comprising:
a storage configured to store structural information of a vehicle body, and
wherein the controller generates the virtual reference signal based on information stored in the storage and a noise signal indicating vibration detected by the vibration detector.

16. A method for controlling a vehicle, the method comprising:
collecting sound by using a sound collector while driving the vehicle; detecting vibration occurring in the vehicle by using a vibration detector;
detecting an occupant in the vehicle by using an occupant detector;
generating a virtual reference signal based on an actual reference signal for the detected vibration; acquiring location information of the occupant's ear based on the occupant information;
generating a virtual error signal based on the acquired ear location information and the actual noise signal for the collected sound;
generating a noise control signal based on the virtual error signal and the virtual reference signal;
outputting the generated noise control signal as sound;
controlling a display to display request information for inputting occupant information for each seat, when diagnosing a failure of at least one of the vibration detector and the sound collector;
generating a virtual microphone based on the occupant information for each seat received by an input; and
regenerating the virtual error signal based on location information of the generated virtual microphone.

17. A controlling method of a vehicle, the method comprising:
collecting sound using a plurality of microphones located at different locations in the vehicle while driving the vehicle;
detecting vibration occurring in the vehicle using plurality of acceleration sensors located at different locations in the vehicle;
detecting an occupant in the vehicle by using an occupant detector;
generating a virtual reference signal based on an active reference signal for the detected vibration;
acquiring location information of the occupant's ear based on the occupant information;
generating a virtual error signal based on the acquired ear location information and the active noise signal for the collected sound;
generating a noise control signal based on the virtual error signal and the virtual reference signal; and
outputting the generated noise control signal as sound,
wherein generating the noise control signal includes diagnosing failures of the plurality of acceleration sensors and the plurality of microphones, generating a virtual reference signal using remaining acceleration sensors when diagnosing a failure at least one of the plurality of acceleration sensors, and generating a noise control signal using remaining microphones when diagnosing a failure at least one of the plurality of microphones, and
the method further comprises:
controlling a display to display request information for inputting occupant information for each seat when diagnosing the failure of at least one of the plurality of acceleration sensors or diagnosing the failure of at least one of the plurality of microphones, generating a virtual microphone based on the occupant information for each seat received by an input, and regenerating the virtual error signal based on location information of the generated virtual microphone.

18. The method according to claim 17, wherein the occupant information includes occupant identification information, occupant height information, occupant age information, or occupant age-specific information.

* * * * *